United States Patent
Grimault et al.

(10) Patent No.: US 10,589,499 B2
(45) Date of Patent: Mar. 17, 2020

(54) PROCESSING MACHINE WITH A LAMINATING MODULE

(71) Applicant: EVOLIS, Beaucouze (FR)

(72) Inventors: Romain Grimault, Beaucouze (FR); Anthony Chiron, Beaucouze (FR)

(73) Assignee: EVOLIS, Beaucouze (FR)

( * ) Notice: Subject to any disclaimer, the term of this patent is extended or adjusted under 35 U.S.C. 154(b) by 158 days.

(21) Appl. No.: 15/553,716

(22) PCT Filed: Mar. 9, 2016

(86) PCT No.: PCT/EP2016/055061
§ 371 (c)(1),
(2) Date: Aug. 25, 2017

(87) PCT Pub. No.: WO2016/142440
PCT Pub. Date: Sep. 15, 2016

(65) Prior Publication Data
US 2017/0368813 A1   Dec. 28, 2017

(30) Foreign Application Priority Data
Mar. 12, 2015   (FR) .................................. 15 52044

(51) Int. Cl.
*B32B 37/00*   (2006.01)
(52) U.S. Cl.
CPC ........ *B32B 37/0053* (2013.01); *B32B 37/025* (2013.01); *B32B 2425/00* (2013.01)
(58) Field of Classification Search
CPC .......................... B32B 37/025; B32B 37/0053
See application file for complete search history.

(56) References Cited

U.S. PATENT DOCUMENTS 5,227,826 A * 7/1993 Sandner .................... B41F 5/20
355/27
5,584,962 A * 12/1996 Bradshaw ............. B32B 37/226
100/176
(Continued)

FOREIGN PATENT DOCUMENTS

EP     2 039 525 A1    3/2009
WO   2014/022088 A1   2/2014

OTHER PUBLICATIONS

May 17, 2016 Search Report issued in International Patent Application No. PCT/EP2016/055061.

*Primary Examiner* — Philip C Tucker
*Assistant Examiner* — John Blades
(74) *Attorney, Agent, or Firm* — Oliff PLC; R. Brian Drozd

(57) ABSTRACT

A processing machine includes: (A) a lamination module including: (A1) a supply roller on which a band carrying a protective film or a layer of varnish to be deposited is wound, (A2) a recovery roller on which the band is wound after the protective film or layer of varnish has been applied to a plastic card, (A3) a heating roller disposed between the supply roller and the recovery roller, (A4) a backing roller disposed against the heating roller, and (A5) a constraining roller; (B) an insertion system defining, with the heating roller, an upstream transfer path along which the plastic card moves as far as the heating roller; (C) a discharge system defining, with the backing roller, a downstream transfer path along which the plastic card moves from the backing roller. The constraining roller is disposed across the downstream transfer path.

15 Claims, 1 Drawing Sheet

(56) References Cited

U.S. PATENT DOCUMENTS

| | | | | |
|---|---|---|---|---|
| 6,095,220 | A | 8/2000 | Kobayashi et al. | |
| 6,484,780 | B2 * | 11/2002 | Ashley | B32B 37/0007 |
| | | | | 156/230 |
| 6,883,573 | B2 * | 4/2005 | Sasaki | B32B 37/0015 |
| | | | | 156/351 |
| 8,957,929 | B2 * | 2/2015 | Sakai | B41J 2/325 |
| | | | | 347/213 |
| 2005/0078998 | A1 * | 4/2005 | Lien | B41J 13/12 |
| | | | | 400/703 |
| 2007/0193692 | A1 * | 8/2007 | Arafat | B32B 37/0053 |
| | | | | 156/552 |

* cited by examiner

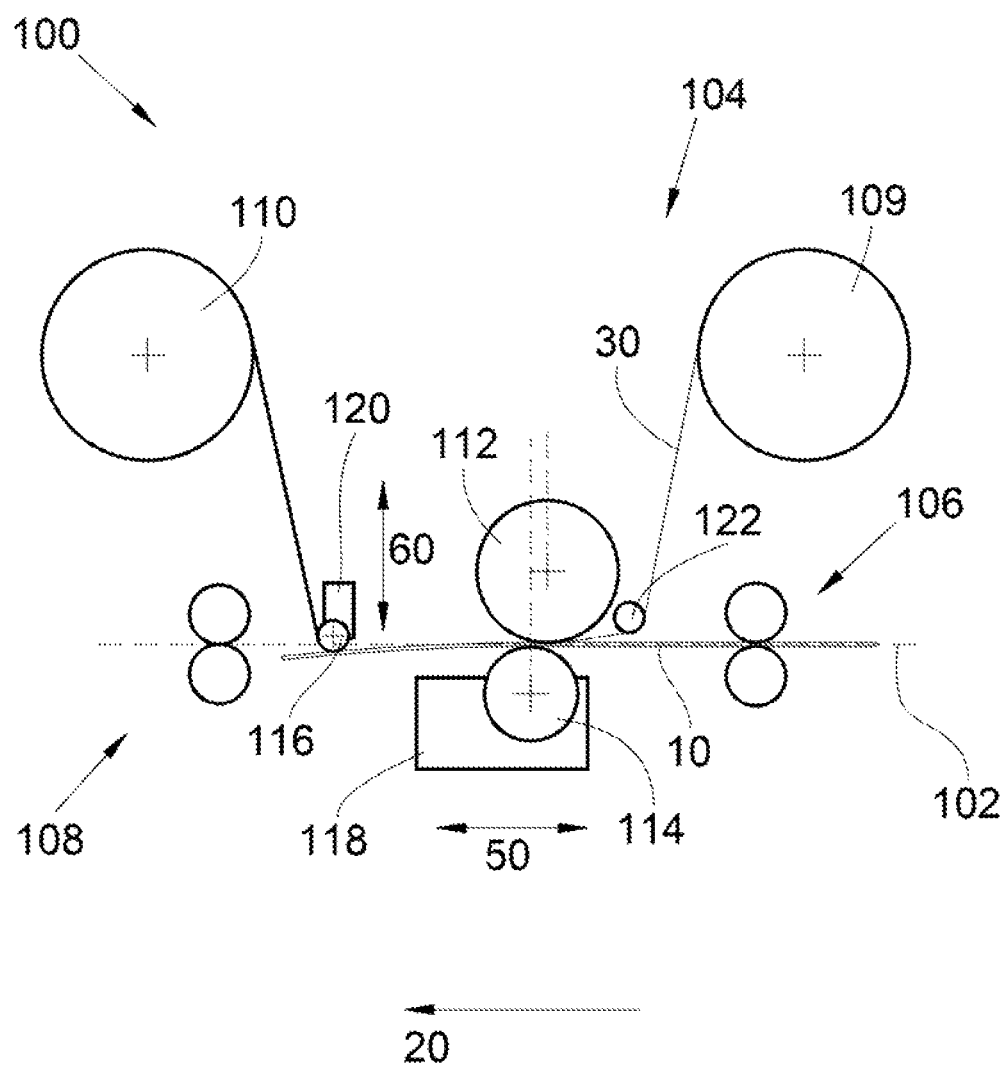

PROCESSING MACHINE WITH A LAMINATING MODULE

The present invention relates to a card processing machine comprising a laminating module, in particular a laminating module for depositing a protective film or a varnish fixed hot to a plastic card.

A processing machine of the prior art makes it possible for example to print on a plastic card and/or to encode a printed circuit (conventionally referred to as a "chip") implanted on the plastic card.

To this end, the processing machine of the prior art comprises:
- a supply system that makes it possible to supply said processing machine with a blank plastic card, this supply system may be a card-by-card supply system or a reservoir of a plurality of cards provided with a card separation system,
- an ejection system that ejects each plastic card from the processing machine after said plastic card has been processed, and
- between the supply system and the ejection system, a processing module that may comprise a print module for printing the plastic card and/or an encoding module that records information on a chip of the plastic card.

To protect the plastic card, a protective film or a layer of varnish is conventionally deposited on the plastic card. This end, the processing machine also comprises, between the processing module and the ejection system, a laminating module that comprises a heating roller that applies the protective film/varnish to the plastic card by pressure or heating.

This hot application causes a deformation of the plastic card, which curves, and the presence of such deformation is not desirable either from an aesthetic point of view or from a functional point of view.

The document WO-A-2014/022088 discloses a processing machine for depositing a protective layer on a card.

One object of the present invention is to propose a processing machine that comprises a lamination module that limits the deformation of the plastic card.

To this end, a processing machine is proposed, designed to deposit a protective film or a layer of varnish on a plastic card, said processing machine comprising:
a lamination module comprising:
a supply roller on which a band carrying the protective film or the layer of varnish to be deposited is wound,
a recovery roller on which the band is wound after the protective film or the layer of varnish has been applied to the plastic card,
a heating roller disposed between the supply roller and the recovery roller, and
a backing roller disposed against the heating roller,
an insertion system defining, with the heating roller, an upstream transfer path along which the plastic card moves as far as the heating roller, and
a discharge system defining, with the backing roller, a downstream transfer path along which the plastic card moves from the backing roller,
the centre of the backing roller being downstream with respect to the centre of the heating roller with respect to a direction of travel of the plastic card, and
the lamination module further comprising a constraining roller disposed across the downstream transfer path.

Advantageously, the lamination module comprises a slide on which the backing roller is mounted, the slide is mounted so as to be able to move in translation along a translation direction parallel to the upstream transfer path, and the slide has a location system configured so as to allow the movement and locking of the slide in various positions along the translation direction.

Advantageously, the lamination module comprises a slide on which the constraining roller is mounted, the slide is mounted so as to be able to move in translation along a translation direction perpendicular to the downstream transfer path and has a location system configured so as to allow the movement and locking of the slide in various positions along the translation direction.

The features of the invention mentioned above, as well as others, will emerge more clearly from a reading of the following description of an example embodiment, said description being given in relation to FIG. 1, which is a schematic representation in cross section of a processing machine according to the invention.

FIG. 1 shows a part of a processing machine 100. As with a processing machine of the prior art, the processing machine 100 according to the invention comprises a supply system, an ejection system and, between the supply system and the ejection system, at least one processing module such as for example a print module and/or an encoding module.

The processing machine 100 has a transfer path 102 along which each plastic card 10 moves successively in a travel direction 20 from upstream to downstream.

Along the transfer path 102, the processing machine 100 comprises a lamination module 104 that is designed to laminate a protective film or a layer of varnish on each card that has undergone the processing (printing, encoding) and which has, at the entry, an insertion system 106 for bringing the plastic card 10 into the lamination module 104 and, at the exit, a discharge system 108 for bringing the plastic card 10 out of the lamination module 104.

The insertion system 106 here takes the form of two rollers disposed on either side of the transfer path 102, wherein one of the two is rotated by a motor, and the discharge system 108 here takes the form of two rollers disposed on either side of the transfer path 102, wherein one of the two is rotated by a motor.

Conventionally, the distance between the insertion system 106 and the extraction system 108 is less than the length of a plastic card 10.

The lamination module 104 comprises:
a supply roller 109 on which a band 30 carrying a protective film or a layer of varnish to be deposited is wound,
a recovery roller 110 on which the band 30 is wound after the protective film or the layer of varnish has been applied to the plastic card 10,
a heating roller 112 between the supply roller 109 and the recovery roller 110, and
a backing roller 114 disposed against the heating roller 112.

The upstream transfer path extends between the insertion system 106 and the heating roller 112. The downstream transfer path extends between the backing roller 114 and the extraction system 108.

The supply roller 109, the recovery roller 110 and the heating roller 112 are on the same side of the transfer path 102 while the backing roller 114 is disposed on the other side of the transfer path 102.

The band 30 extends from the supply roller 109 as far as the recovery roller 110, passing between the heating roller 112 and the backing roller 114.

In general terms, when a plastic card 10 must be covered with a protective film or a layer of varnish, it arrives through the insertion system 106 and moves forward as far as the heating roller 112 and the backing roller 114, where it is gripped between them and wherein one of them is rotated by a motor. The plastic card 10 then continues its progress and at the same time receives the protective film or the varnish, until it arrives at the discharge system 108, where it emerges from the lamination module 104.

In order to compensate for the deformation of the plastic card 10 under the effect of the heat of the heating roller 112:
- the centre of the heating roller 112 and the centre of the backing roller 114 are not aligned on a straight line perpendicular to the upstream transfer path, or more precisely the centre of the backing roller 114 is downstream with respect to the centre of the heating roller 112 with respect to the direction of travel 20, and
- the lamination module 114 comprises a constraining roller 116 that is disposed across the downstream transfer path, that is to say the constraining roller 116 is situated under the downstream transfer path, thus obliging the plastic card 10 that is coming from the heating roller 112 to move away from the downstream transfer path and therefore to deform in order to move forward.

The offset between the two centres makes it possible to divert the plastic card 10 by orienting it here upwards and the position of the constraining roller 116 tends to orient the card in the opposite direction, here by folding it down.

The distance between the centre of the backing roller 114 and the centre of the heating roller 112 is preferably strictly greater than 0 and less than 6 mm and more particularly strictly greater than 0 and less than 3 mm.

Since the dimensions and quality of plastic cards 10 used may vary, it is preferable for the position of the backing roller 114 with respect to the heating roller 112 to be able to be modified, and/or for the distance from the centre of the constraining roller 116 to the downstream transfer path to be able to be modified. These adjustments can be made by the user of the processing machine 100.

To modify the position of the backing roller 114 with respect to the heating roller 112, the lamination module 104 comprises a slide 118 on which the backing roller 114 is mounted. The slide 118 is mounted so as to be able to move in translation (double arrow 50) along a translation direction parallel to the upstream transfer path on a frame of the processing machine 100 and has a location system configured so as to allow the movement and locking of the slide 118 in various positions along the translation direction.

The location system may for example be a conventional screw and nut system the screw of which is fixed with respect to translation with respect to the frame and the nut of which is secured to the slide 118. Thus a rotation of the screw will cause the movement of the slide 118.

To modify the distance from the centre of the constraining roller 116 to the downstream transfer path, the lamination module 104 comprises another slide 120 on which the constraining roller 116 is mounted. The other slide 120 is mounted so as to be able to move in translation (double arrow 60) along another translation direction perpendicular to the downstream transfer path on the frame of the processing machine 100 and has another location system configured so as to allow the movement and locking of the other slide 120 in various positions along the other translation direction. The other location system may be identical to the location system already described. The position of the constraining roller 116 must however remain compatible with the fact that, when the plastic card 10 reaches said constraining roller 116, it is obligatorily directed under the constraining roller 116.

To prevent the band 30 sticking on the heating roller 112 on the upstream periphery thereof, the lamination module 104 has a separation roller 122 that is disposed just upstream of the heating roller 112 and level with the upstream transfer path.

So that the pressure between the heating roller 112 and the backing roller 114 remain substantially the same whatever the position of the backing roller 114, at least one from among the heating roller 112 and the backing roller 114 is mounted on the frame by means of a suspension system, for example of the compression spring type.

The invention claimed is:

1. A processing machine designed to deposit a protective film or a layer of varnish on a plastic card, said processing machine comprising:
    a lamination module comprising:
        a supply roller on which a band carrying the protective film or the layer of varnish to be deposited is wound,
        a recovery roller on which the band is wound after the protective film or the layer of varnish has been applied to the plastic card,
        a heating roller disposed between the supply roller and the recovery roller,
    and
        a backing roller disposed to form a laminating nip with against the heating roller,
        an insertion system defining, with the heating roller, an upstream transfer path along which the plastic card moves as far as the heating roller, and
        a discharge system defining, with the backing roller, a downstream transfer path along which the plastic card moves from the backing roller,
            the center of the backing roller being downstream with respect to the center of the heating roller with respect to a direction of travel of the plastic card, and
            the lamination module further comprising a constraining roller on which the band travels, the constraining roller being disposed across the downstream transfer path between the laminating nip and the discharge system in a way that when a plastic card arrives from the laminating nip, the plastic card travels under said constraining roller so that said constraining roller creates a force to bend the plastic card.

2. The processing machine according to claim 1, wherein the lamination module comprises a slide on which the backing roller is mounted, in that the slide is mounted so as to be able to move in translation along a translation direction parallel to the upstream transfer path, and in that the slide has a location system configured so as to allow the movement and locking of the slide in various positions along the translation direction.

3. The processing machine according to claim 2, wherein the lamination module comprises a second slide on which the constraining roller is mounted, and wherein the second slide is mounted so as to be able to move in translation along a translation direction perpendicular to the downstream transfer path and has a location system configured so as to allow the movement and locking of the second slide in various positions along the translation direction.

4. The processing machine according to claim 1, wherein the lamination module comprises a slide on which the constraining roller is mounted, and wherein the slide is mounted so as to be able to move in translation along a translation direction perpendicular to the downstream transfer path and has a location system configured so as to allow the movement and locking of the slide in various positions along the translation direction.

5. The processing machine according to claim 1, wherein the center of the backing roller is adjustable relative to the center of the heating roller with respect to the direction of travel of the plastic card.

6. The processing machine according to claim 5, further comprising a first slide on which the backing roller is mounted, wherein the first slide is configured to adjust the position of the center of the backing roller relative to the center of the heating roller with respect to the direction of travel of the plastic card.

7. The processing machine according to claim 6, further comprising a lock in order to lock the backing roller into place in various positions along the first slide in the direction of travel of the plastic card after.

8. The processing machine according to claim 6, further comprising a second slide on which the constraining roller is mounted, wherein the second slide is configured to adjust the position of the center of the constraining roller in a direction perpendicular to travel of the plastic card.

9. The processing machine according to claim 8, wherein the first slide is adjusted based on adjustment of the second slide or the second slide is adjusted based on adjustment of the first slide.

10. The processing machine according to claim 1, wherein the offset between the center of the backing roller and the center of the heating roller diverts the plastic card by bending the plastic card upwards, and wherein the position of the constraining roller bends the card in downwards.

11. The processing machine according to claim 1, further comprising a slide on which the constraining roller is mounted, wherein the slide is configured to adjust the position of the center of the constraining roller in a direction perpendicular to travel of the plastic card.

12. The processing machine according to claim 9, further comprising a lock in order to lock the constraining roller into place in various positions along the slide in the direction perpendicular to travel of the plastic card.

13. A processing machine designed to deposit a protective film or a layer of varnish on a plastic card, said processing machine comprising:
a lamination module comprising:
a supply roller on which a band carrying the protective film or the layer of varnish to be deposited is wound,
a recovery roller on which the band is wound after the protective film or the layer of varnish has been applied to the plastic card,
a heating roller disposed between the supply roller and the recovery roller,
a backing roller disposed to form a laminating nip with the heating roller, and
a first slide on which the backing roller is mounted, wherein the first slide is configured to adjust the position of the center of the backing roller relative to the center of the heating roller with respect to the direction of travel of the plastic card,
an insertion system defining, with the heating roller, an upstream transfer path along which the plastic card moves as far as the heating roller, and
a discharge system defining, with the backing roller, a downstream transfer path along which the plastic card moves from the backing roller,
the center of the backing roller being downstream with respect to the center of the heating roller with respect to a direction of travel of the plastic card, and
the lamination module further comprising:
a constraining roller disposed across the downstream transfer path between the laminating nip and the discharge system in a way that when a plastic card arrives from the laminating nip, the plastic card travels under said constraining roller; and
a second slide on which the constraining roller is mounted, wherein the second slide is configured to adjust the position of the center of the constraining roller in a direction perpendicular to travel of the plastic card.

14. The processing machine according to claim 13, wherein the second slide is mounted so as to be able to move in translation along a translation direction perpendicular to the downstream transfer path and has a location system configured so as to allow the movement and locking of the second slide in various positions along the translation direction.

15. The processing machine according to claim 13, further comprising a lock in order to lock the backing roller into place in various positions along the first slide in the direction of travel of the plastic card after.

* * * * *